(12) United States Patent
Kiuchi et al.

(10) Patent No.: US 11,036,516 B2
(45) Date of Patent: Jun. 15, 2021

(54) PARALLEL DISTRIBUTED PROCESSING CONTROL SYSTEM, PROGRAM, AND PARALLEL DISTRIBUTED PROCESSING CONTROL METHOD

(71) Applicant: HITACHI, LTD., Tokyo (JP)

(72) Inventors: Atsuki Kiuchi, Tokyo (JP); Tazu Nomoto, Tokyo (JP); Yasuo Bakke, Tokyo (JP); Takahiro Ogura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/436,948

(22) Filed: Jun. 11, 2019

(65) Prior Publication Data

US 2020/0081720 A1 Mar. 12, 2020

(30) Foreign Application Priority Data

Sep. 12, 2018 (JP) .............................. JP2018-170477

(51) Int. Cl.
*G06F 9/50* (2006.01)
*G06Q 10/08* (2012.01)
*G06F 9/38* (2018.01)
*G06F 9/30* (2018.01)

(52) U.S. Cl.
CPC ........ *G06F 9/3885* (2013.01); *G06F 9/30094* (2013.01); *G06F 9/3877* (2013.01); *G06Q 10/08* (2013.01); *G06F 9/50* (2013.01); *G06Q 10/087* (2013.01)

(58) Field of Classification Search
CPC .. G06F 9/3885; G06F 9/30094; G06F 9/3877; G06F 9/3891; G06F 9/50; G06F 9/5083; G06F 9/5044; G06F 9/505; G06F 9/5055; G06F 9/5066; G06F 8/451; G06F 2009/4557; G06F 11/3447; G06F 2209/5018; G06F 2209/5019;
(Continued)

(56) References Cited

U.S. PATENT DOCUMENTS

2006/0101052 A1* 5/2006 Netrakanti ............. G06Q 10/00
2008/0052719 A1* 2/2008 Briscoe ............... H04L 41/0856
718/104
2016/0363973 A1* 12/2016 Cudak ..................... G06F 1/206

FOREIGN PATENT DOCUMENTS

JP 2008-117309 A 5/2008

\* cited by examiner

*Primary Examiner* — Daniel H Pan
(74) *Attorney, Agent, or Firm* — Mattingly & Malur, PC

(57) ABSTRACT

A parallel distributed processing control system used in production distribution planning includes: a storage unit storing step information of steps constituting a production distribution process of a product, CPU information of CPUs that calculate a value of a simulation result for the step, and a constraint value in the production distribution process; a divided model generation unit generating a divided model by grouping the steps; a CPU allocation unit allocating the divided model to the plurality of CPUs; an engine execution unit enabling the CPU to calculate the value for the step constituting the divided model; and a constraint monitoring unit determining whether the value satisfies a condition specified by the constraint value. An output information generation unit generates result information using the value satisfying the condition; and the CPU allocation unit allocates the divided model so that processing loads of the plurality of CPUs are equalized.

9 Claims, 20 Drawing Sheets

(58) Field of Classification Search
CPC .. G06Q 10/08; G06Q 10/083; G06Q 10/0833; G06Q 10/087; G06Q 10/0875
USPC ............... 712/220, 227, 225; 718/104, 105; 717/103, 104, 130; 703/13, 14, 22, 27; 705/330, 332, 333, 348
See application file for complete search history.

[FIG. 1]
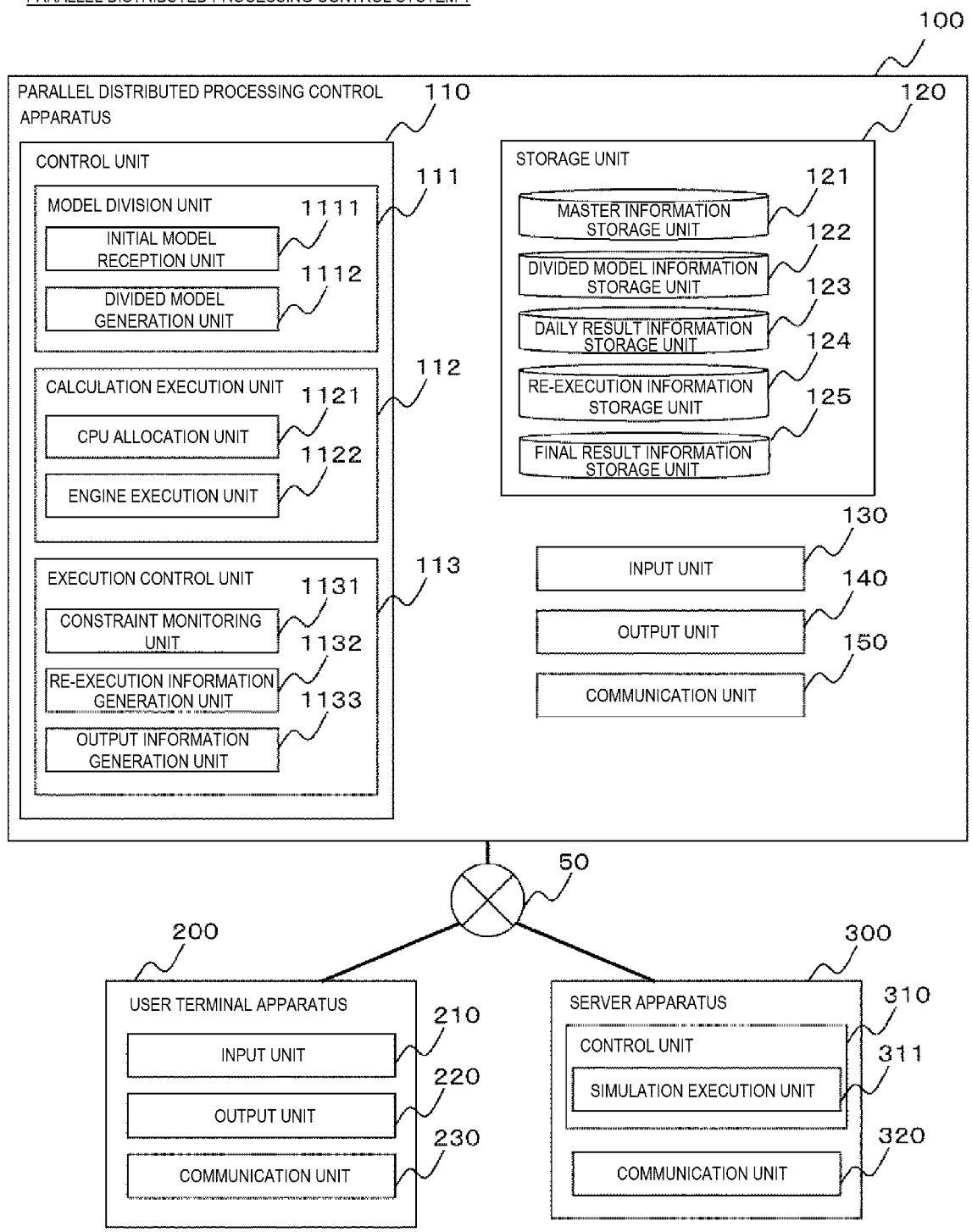

[FIG. 2]
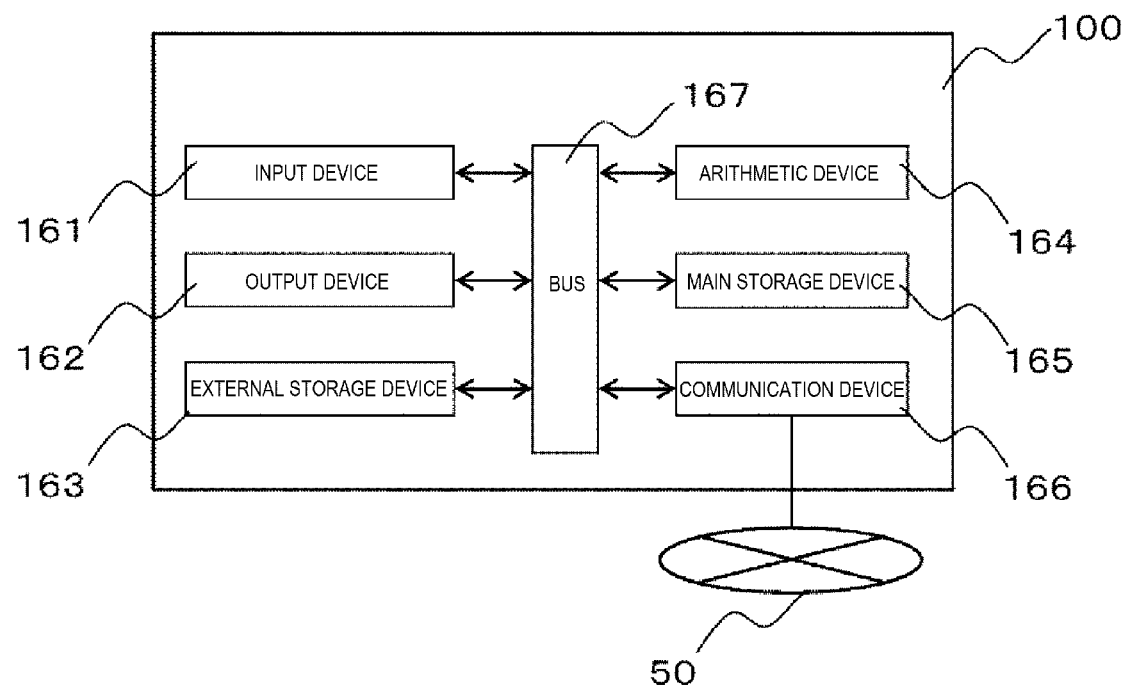

[FIG. 3]

SUPPLY CHAIN CONFIGURATION MASTER 10

| COMPANY NAME | COMPANY CLASS | ITEM | SUPPLIER COMPANY | CUSTOMER COMPANY |
|---|---|---|---|---|
| FACTORY A | FACTORY | ITEM A | SUPPLIER A | - |
| FACTORY A | FACTORY | ITEM B | SUPPLIER A | - |
| FACTORY A | FACTORY | ITEM C | - | WAREHOUSE A |
| ... | | ... | ... | ... |
| WAREHOUSE A | WAREHOUSE | ITEM C | FACTORY A | SALES COMPANY A |
| MARKET A | MARKET | ITEM B | SALES COMPANY A | - |
| ... | | ... | ... | ... |

ITEM MASTER 20

| ITEM NAME | WEIGHT | VOLUME |
|---|---|---|
| ITEM A | 2kg | 0.8CBM |
| ITEM B | 1.5kg | 1.1CBM |
| ITEM C | 0.8kg | 0.5CBM |
| ... | ... | ... |

CONSTRAINT MASTER 30

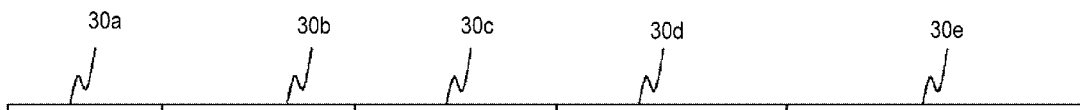

| COMPANY | CONSTRAINT ITEM | CONSTRAINT TYPE | CONSTRAINT VALUE | PRIORITY CONSTRAINT FLAG |
|---|---|---|---|---|
| FACTORY A | PRODUCTION QUANTITY | UPPER LIMIT | 100 PIECES/DAY | 1 |
| WAREHOUSE A | DELIVERY QUANTITY | UPPER LIMIT | 200 CBM/DAY | 0 |
| WAREHOUSE A | DELIVERY QUANTITY | LOWER LIMIT | 50 CBM/DAY | 0 |
| WAREHOUSE A | INVENTORY QUANTITY | UPPER LIMIT | 200 CBM/DAY | 0 |
| WAREHOUSE A | STORAGE QUANTITY | UPPER LIMIT | 800 PIECES/DAY | 1 |
| WAREHOUSE A | TRANSPORT QUANTITY | UPPER LIMIT | 270 CBM/DAY | 1 |
| FACTORY B | PRODUCTION QUANTITY | UPPER LIMIT | 80 PIECES/DAY | 0 |
| ... | ... | ... | ... | ... |

[FIG. 6]

BOM MASTER 40

| PARENT ITEM (40a) | CHILD ITEM (40b) | CONSUMPTION QUANTITY (40c) |
|---|---|---|
| ITEM A | ITEM α | 2 |
| ITEM A | ITEM β | 3 |
| ITEM B | ITEM γ | 4 |
| ITEM B | ITEM θ | 2 |
| ITEM C | ITEM θ | 3 |
| ... | ... | ... |

[FIG. 7]
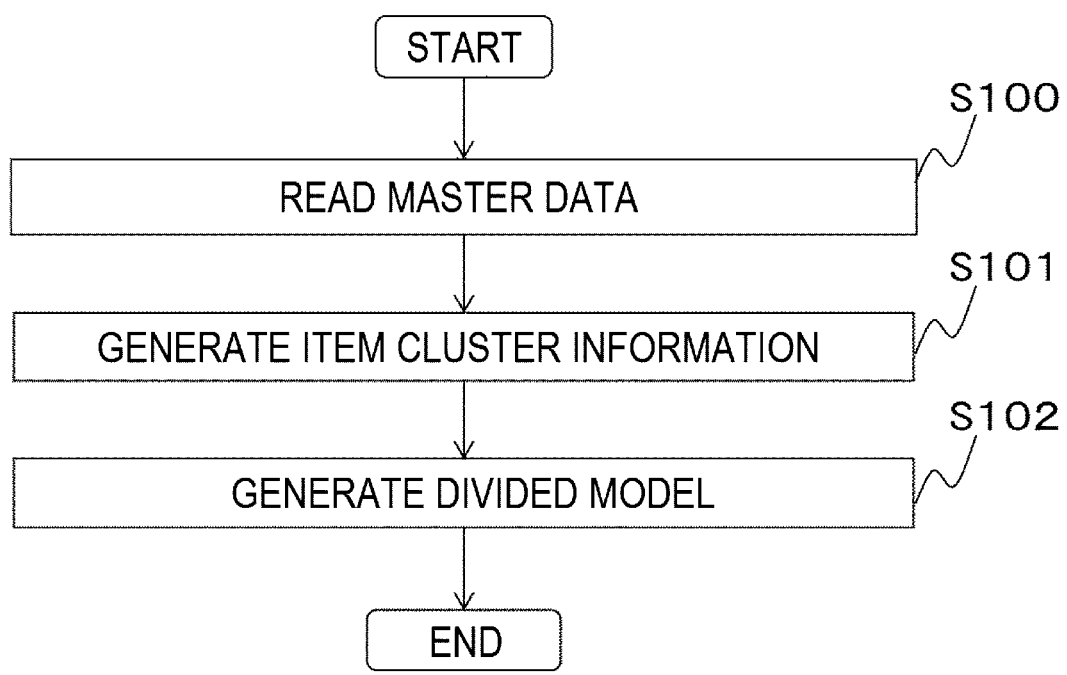

[FIG. 8]

ITEM CLUSTER INFORMATION 1220

| CLUSTER IDENTIFICATION INFORMATION (1220a) | ITEM (1220b) |
|---|---|
| G1 | ITEM A |
| G1 | ITEM α |
| G1 | ITEM β |
| G2 | ITEM B |
| G2 | ITEM γ |
| G2 | ITEM θ |
| G2 | ITEM C |
| ... | ... |

[FIG. 9]
DIVIDED MODEL INFORMATION 1221
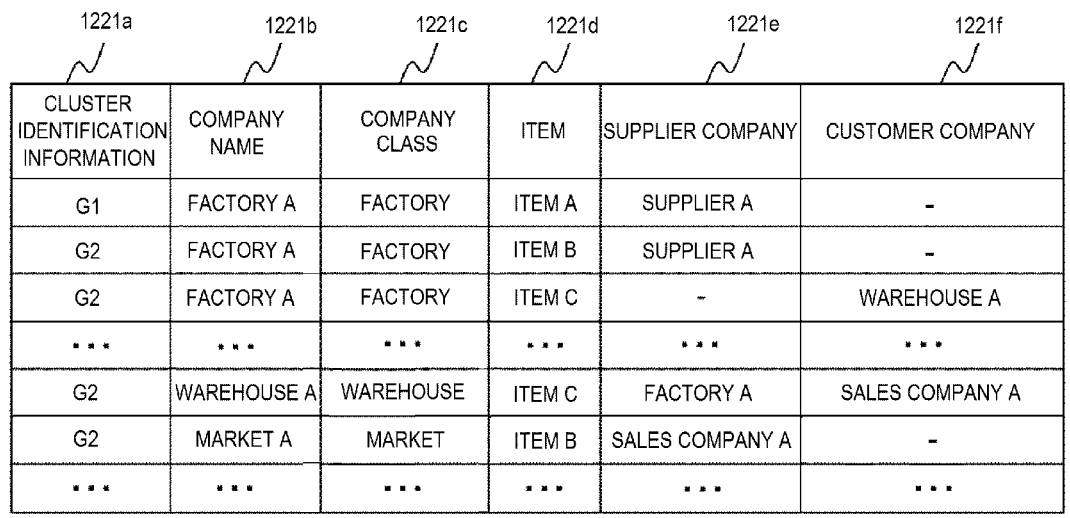
| CLUSTER IDENTIFICATION INFORMATION | COMPANY NAME | COMPANY CLASS | ITEM | SUPPLIER COMPANY | CUSTOMER COMPANY |
|---|---|---|---|---|---|
| G1 | FACTORY A | FACTORY | ITEM A | SUPPLIER A | - |
| G2 | FACTORY A | FACTORY | ITEM B | SUPPLIER A | - |
| G2 | FACTORY A | FACTORY | ITEM C | - | WAREHOUSE A |
| ... | ... | ... | ... | ... | ... |
| G2 | WAREHOUSE A | WAREHOUSE | ITEM C | FACTORY A | SALES COMPANY A |
| G2 | MARKET A | MARKET | ITEM B | SALES COMPANY A | - |
| ... | ... | ... | ... | ... | ... |

[FIG. 10]
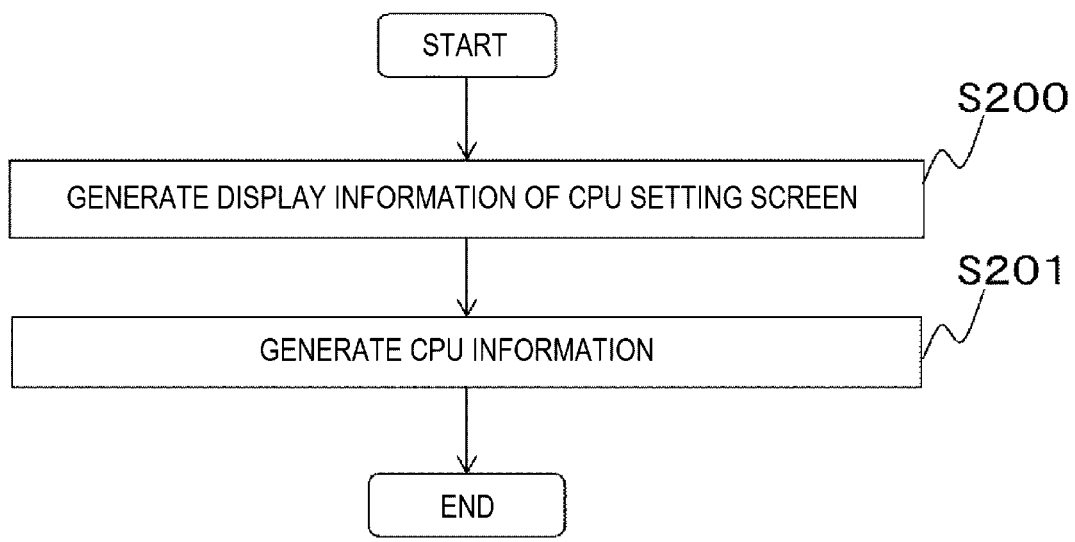

[FIG. 11]
CPU INFORMATION 1222
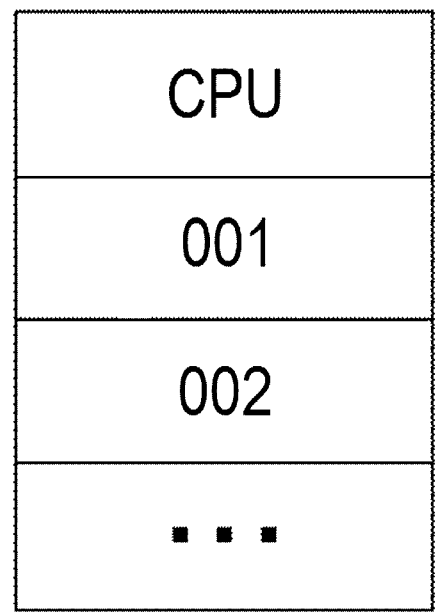

[FIG. 12]
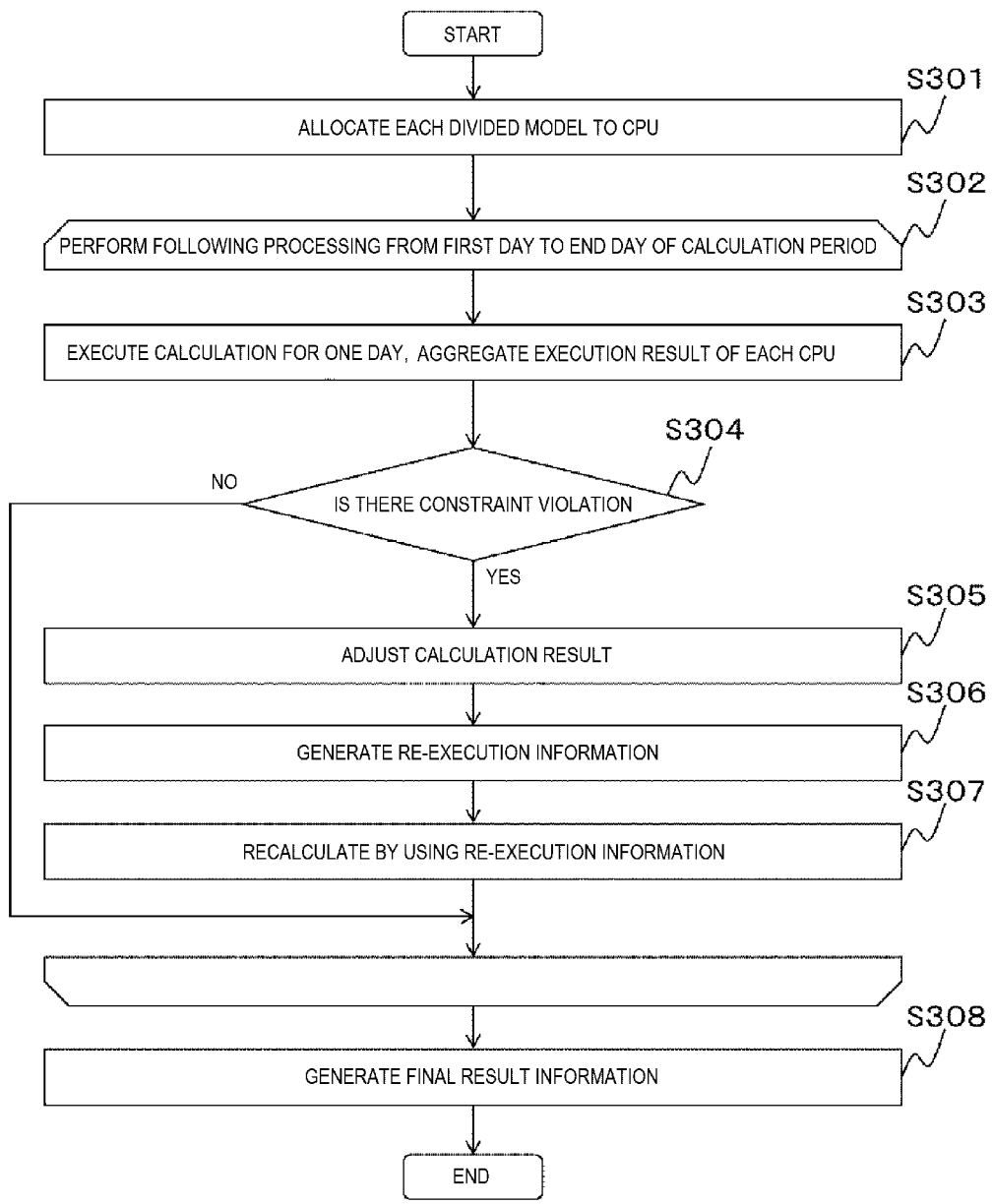

[FIG. 13]
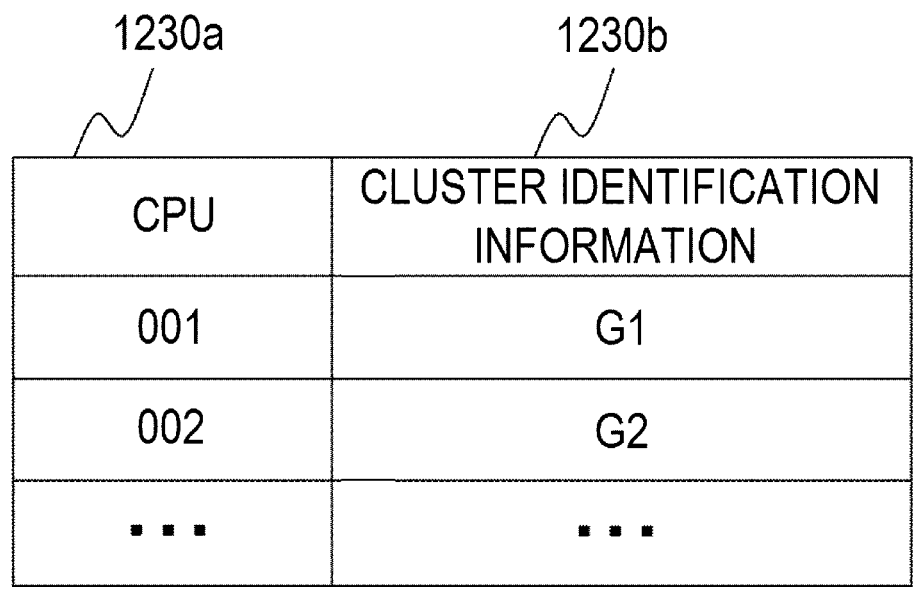

[FIG. 14]

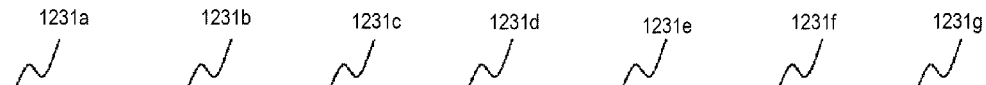

DAILY RESULT INFORMATION 1231

| CALCULATION TIME | CPU | COMPANY | ITEM | CONSTRAINT ITEM | RESULT DAY | RESULT |
|---|---|---|---|---|---|---|
| 1231a | 1231b | 1231c | 1231d | 1231e | 1231f | 1231g |
| 2018/3/1 | 001 | FACTORY A | ITEM A | PRODUCTION QUANTITY | 2018/3/1 | 130 |
| 2018/3/1 | 001 | WAREHOUSE A | ITEM A | DELIVERY QUANTITY | 2018/3/1 | 280 |
| 2018/3/1 | 001 | FACTORY A | ITEM A | PRODUCTION QUANTITY | 2018/3/2 | 80 |
| 2018/3/1 | 001 | FACTORY A | ITEM A | PRODUCTION QUANTITY | 2018/3/3 | 140 |
| 2018/3/1 | ... | ... | ... | ... | ... | ... |
| 2018/3/1 | 002 | FACTORY A | ITEM B | PRODUCTION QUANTITY | 2018/3/1 | 120 |
| 2018/3/1 | 002 | WAREHOUSE A | ITEM B | DELIVERY QUANTITY | 2018/3/1 | 120 |
| 2018/3/1 | ... | ... | ... | ... | ... | ... |

[FIG. 15]

[FIG. 16]
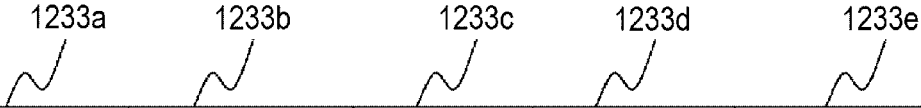

[FIG. 17]

RE-EXECUTION INFORMATION 1240

| CPU | RE-EXECUTION DAY | COMPANY | ITEM | CONSTRAINT ITEM | RESULT DAY | TARGET VALUE |
|---|---|---|---|---|---|---|
| 001 | 2018/3/1 | FACTORY A | ITEM A | PRODUCTION QUANTITY | 2018/3/1 | 52 |
| ... | ... | ... | ... | ... | ... | ... |
| 002 | 2018/3/1 | FACTORY A | ITEM B | PRODUCTION QUANTITY | 2018/3/1 | 48 |
| ... | ... | ... | ... | ... | ... | ... |

Columns: 1240a, 1240b, 1240c, 1240d, 1240e, 1240f, 1240g

[FIG. 18]

FINAL RESULT INFORMATION 1250

| COMPANY | ITEM | CALCULATION TIME | RESULT ITEM | PLANNED DAY | QUANTITY |
|---|---|---|---|---|---|
| FACTORY A | ITEM A | 2018/3/1 | PRODUCTION QUANTITY | 2018/3/1 | 51 |
| FACTORY A | ITEM B | 2018/3/1 | PRODUCTION QUANTITY | 2018/3/1 | 48 |
| FACTORY A | ITEM A | 2018/3/1 | PRODUCTION QUANTITY | 2018/3/2 | 98 |
| FACTORY B | ITEM A | 2018/3/1 | PRODUCTION QUANTITY | 2018/3/1 | 20 |
| ... | ... | ... | ... | ... | ... |

1250a  1250b  1250c  1250d  1250e  1250f

[FIG. 19]
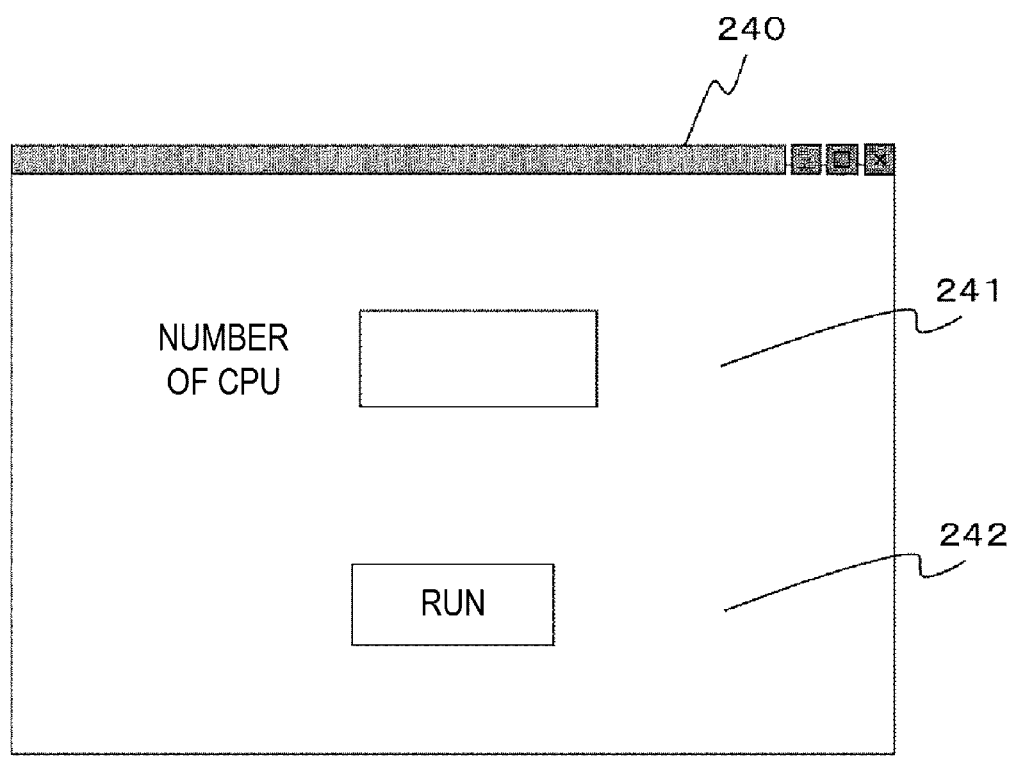

[FIG. 20]
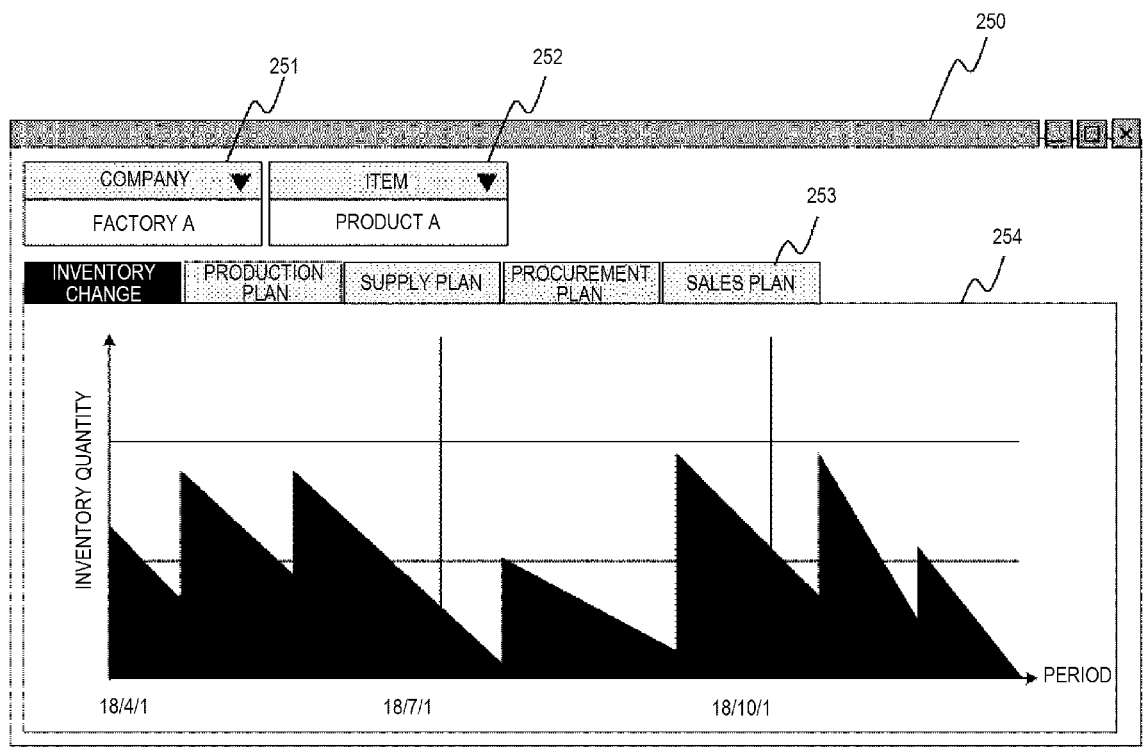

PARALLEL DISTRIBUTED PROCESSING CONTROL SYSTEM, PROGRAM, AND PARALLEL DISTRIBUTED PROCESSING CONTROL METHOD

CROSS-REFERENCE TO RELATED APPLICATION

The present application claims priority from Japanese application JP 2018-170477, filed on Sep. 12, 2018, the contents of which is hereby incorporated by reference into this application.

TECHNICAL FIELD

The present invention relates to a parallel distributed processing control system, a program, and a parallel distributed processing control method.

BACKGROUND ART

There are various techniques that generate production and distribution schedules.

Paragraph "0014" of PTL 1 discloses that "in the present embodiment, based on input data representing all or a part of a product acceptance plan, a product shipping plan, an inventory plan, an equipment usage plan, an equipment repair plan, equipment capacity, a present state of equipment, a present state of a step, a present state of an inventory, a present state of equipment operation and failure, and operating preconditions from an operator regarding a manufacturing process and conveyance, and for a target period preset from a planning start day and time of the above-described production and distribution plan is targeted, and a mathematical model 321 is constructed for relationships and constraints of a work group accompanying processing of a product, a moving body, and equipment based on preset accuracy". Further, paragraph "0040" describes that "since an initial value is changed while a calculation range is divided as described above, calculation can be performed within practical time even in a case where a schedule problem having a large calculation load is calculated".

PRIOR ART LITERATURE

Patent Literature

PTL 1: JP-A-2008-117309

SUMMARY OF INVENTION

Technical Problem

It is desired to improve calculation efficiency when a production distribution plan is made.

In the technique disclosed in PTL 1, a plan creation period is divided and calculated, but improved efficiency that should be obtained by division is reduced since an order dependency relationship occurs between divided models.

The invention has been made in view of the above circumstances, and an object thereof is to provide a technique that supports more efficient production distribution planning.

Solution to Problem

The present invention includes a plurality of sections that solve at least a part of the problems described above, and examples thereof are as follows.

In order to solve the above problems, the invention provides a parallel distributed processing control system. The system includes: a storage unit that stores step information including a plurality of steps constituting a production distribution process of a product, CPU information on a plurality of CPUs that calculate a value of a simulation result for the step, and a constraint value in the production distribution process; a divided model generation unit that generates a divided model by grouping the plurality of steps; a CPU allocation unit that allocates the divided model to the plurality of CPUs; an engine execution unit that enables the CPU to calculate the value for the step constituting the divided model; a constraint monitoring unit that determines whether the value satisfies a condition specified by the constraint value; and an output information generation unit that generates result information by using the value satisfying the condition, in which the CPU allocation unit allocates the divided model so that processing loads of the plurality of CPUs are equalized.

Advantageous Effect

According to the invention, a technique that supports more efficient production distribution planning can be provided.

Problems, configurations, and effects other than those described above are apparent from the following description of the embodiments.

BRIEF DESCRIPTION OF DRAWINGS

FIG. 1 is a diagram showing an example of a functional block diagram of a parallel distributed processing control system.

FIG. 2 is a diagram showing an example of a hardware configuration of a parallel distributed processing control apparatus.

FIG. 3 is a diagram showing an example of a data structure of a supply chain configuration master.

FIG. 4 is a diagram showing an example of a data structure of an item master.

FIG. 5 is a diagram showing an example of a data structure of a constraint master.

FIG. 6 is a diagram showing an example of a data structure of a bill of materials (BOM) master.

FIG. 7 is a flowchart showing an example of divided model generation processing according to the present embodiment.

FIG. 8 is a diagram showing an example of a data structure of item cluster information.

FIG. 9 is a diagram showing an example of a data structure of divided model information.

FIG. 10 is a flowchart showing an example of CPU information generation processing.

FIG. 11 is a diagram showing an example of a data structure of CPU information.

FIG. 12 is a flowchart showing an example of planning processing.

FIG. 13 is a diagram showing an example of a data structure of CPU allocation information.

FIG. 14 is a diagram showing an example of a data structure of daily result information.

FIG. 15 is a diagram showing an example of a data structure of constraint violation information.

FIG. 16 is a diagram showing an example of a data structure of result adjustment information.

FIG. 17 is a diagram showing an example of a data structure of re-execution information.

FIG. 18 is a diagram showing an example of a data structure of final result information.

FIG. 19 is a diagram showing an example of a CPU setting screen.

FIG. 20 is a diagram showing an example of a final result display screen.

DESCRIPTION OF EMBODIMENTS

A production distribution process of a product, from procurement of raw materials and parts to manufacture, inventory management, distribution, and sale, is currently operated as a supply chain. In operation of the supply chain, it is necessary to cope with a change in a management environment such as demand variation and disaster. For this reason, there is a method of reproducing actual work in a digital space, making an inventory arrangement or a production plan that satisfies a target demand fulfillment rate and minimize the cost by using simulation, and feeding back to practice.

In order to create a plan or an instruction that can be used in practice, it is necessary to model an entire target, and to obtain a highly accurate result within practical time taking detailed constraints into consideration. A parallel distributed processing control system according to the present embodiment supports efficient production distribution planning in the supply chain.

Hereinafter, the examples in the embodiments of the invention are described with reference to the drawings. FIG. 1 is a diagram showing an example of a functional block diagram of a parallel distributed processing control system 1. The parallel distributed processing control system 1 includes a parallel distributed processing control apparatus 100, a user terminal apparatus 200, and a server apparatus 300. The parallel distributed processing control apparatus 100 is communicably connected to one or more user terminal apparatuses 200 and one or more server apparatuses 300 via a network 50.

The parallel distributed processing control apparatus 100 is a terminal apparatus such as a personal computer (PC) or a server computer. The user terminal apparatus 200 is a terminal apparatus such as a PC or a smartphone. The server apparatus 300 is an information processing apparatus such as a server computer. FIG. 1 shows a state in which one user terminal apparatus 200 and one server apparatus 300 are connected to one parallel distributed processing control apparatus 100, but the number of the apparatuses is not limited thereto.

As an example, the parallel distributed processing control apparatus 100, the user terminal apparatus 200, and the server apparatus 300 are operated by a client of a production planning support service provided by the present embodiment. As another example, the parallel distributed processing control apparatus 100 and the server apparatus 300 are operated by an operator of the production planning support service, and the user terminal apparatus 200 is operated by the client.

The parallel distributed processing control apparatus 100 includes a control unit 110, a storage unit 120, an input unit 130, an output unit 140, and a communication unit 150. The control unit 110 integrally controls the entire parallel distributed processing control apparatus 100. The storage unit 120 stores information input to the parallel distributed processing control apparatus 100 and information generated during processing of the parallel distributed processing control apparatus 100.

The input unit 130 receives input operation from a user by using an input device 161 described below. The output unit 140 outputs information to an output device such as a display. The communication unit 150 transmits and receives information to and from the user terminal apparatus 200 or the server apparatus 300.

The control unit 110 includes a model division unit 111, a calculation execution unit 112, and an execution control unit 113. The model division unit 111 controls divided model generation configured to efficiently make a production plan. The calculation execution unit 112 controls simulation that uses a plurality of central processing units (CPUs). The execution control unit 113 determines whether a constraint condition is satisfied with reference to a simulation result, and outputs a result in accordance with the input operation.

The model division unit 111 includes an initial model reception unit 1111 and a divided model generation unit 1112. The initial model reception unit 1111 reads master data generated during the production distribution process of the product as an initial model. The master data is read from, for example, the user terminal apparatus 200 into the initial model reception unit 1111 via the network 50, and is stored in a master information storage unit 121 described below. The master data includes a supply chain configuration master as step information including a plurality of steps constituting the production distribution process.

The divided model generation unit 1112 groups the plurality of steps included in the supply chain configuration master, so that a calculation model to be simulated is divided to generate a divided model. The divided model generation unit 1112 groups the steps based on, for example, items of the product included in the supply chain configuration master.

The calculation execution unit 112 includes a CPU allocation unit 1121 and an engine execution unit 1122. The CPU allocation unit 1121 allocates the divided model to the plurality of CPUs. At this time, the CPU allocation unit 1121 allocates the divided model so that processing loads of the plurality of CPUs are equalized. As an example, the CPU allocation unit 1121 performs allocation such that the number of items included in the divided model is equalized. The CPU allocation unit 1121 allocates the calculation model, which constitutes re-execution information generated in a case where a value calculated under control of the engine execution unit 1122 described below does not satisfy a constraint condition, to the plurality of CPUs.

The fact that the CPU allocation unit 1121 allocates the divided model to the CPUs so that the processing loads of the CPUs are equalized does not mean that the processing load of each CPU is uniform as a result. For example, according to the present embodiment, the number of items in the divided model is used as a guide for processing load estimation, but even if the simulation is performed by using different CPUs for the divided model having the same number of items, there may be some variation in the processing load depending on content of the divided model.

Meaning of response time equalizing is contained in processing load equalizing. For example, it is assumed that the simulation is performed by dividing the calculation model so that plan creation period is equal when the calculation model is divided. A calculation model whose time is later in the plan is calculated after a calculation model whose time is earlier in the plan, and an order dependency relationship occurs between the calculation models. In this case, since response time of the calculation model whose time is later is measured from the start of processing of the calculation model whose time is earlier, a large difference occurs in response time of both models. That is, it can be said that the method of dividing the calculation model so that the respective plan creation periods are equal is not intended to equalize the processing loads.

The engine execution unit 1122 enables each of the plurality of CPUs to which the divided model is assigned to execute calculation processing for planning of the production distribution plan, that is, simulation of the production distribution process. As a result, values such as a production quantity, a storage fee, a delivery quantity, a storage quantity, or a transport quantity for the current and future product are calculated for each step constituting the divided model. The engine execution unit 1122 enables each CPU to execute the simulation that uses information included in the master data. Since a known method is used for the simulation, the description thereof is omitted.

The engine execution unit 1122 enables the CPU to which the calculation model constituting the re-execution information is allocated to execute the simulation by using the re-execution information, and obtains a value of a re-simulation result.

The execution control unit 113 includes a constraint monitoring unit 1131, a re-execution information generation unit 1132, and an output information generation unit 1133. The constraint monitoring unit 1131 determines whether the value obtained by the engine execution unit 1122 satisfies a constraint condition specified by a preset constraint value for the production distribution process. For a step in which the value is determined as not satisfying a constraint condition, the re-execution information generation unit 1132 sets a target value by using a constraint value and generates the re-execution information associated with the step.

The output information generation unit 1133 generates result information by using a value satisfying a constraint condition. The output information generation unit 1133 generates output information of a final result display screen 250 described below by using the result information, and transmits the output information to the user terminal apparatus 200. Upon receiving an instruction to start CPU information generation processing, the output information generation unit 1133 generates display information of a CPU setting screen 240 described below, and transmits the display information to the user terminal apparatus 200.

The storage unit 120 includes a master information storage unit 121, a divided model information storage unit 122, a daily result information storage unit 123, a re-execution information storage unit 124, and a final result information storage unit 125. The master information storage unit 121 is a storage area to store the master data read by the initial model reception unit 1111. The divided model information storage unit 122 is a storage area to store divided model information, and item cluster information and CPU information which are used for generating the divided model information.

The daily result information storage unit 123 is a storage area to store CPU allocation information used for allocating the divided model to each CPU, daily result information indicating a simulation result calculated by each CPU, constraint violation information on a value not satisfying a constraint condition, and result adjustment information used for adjusting the value for a step not satisfying a constraint condition. The re-execution information storage unit 124 is a storage area to store the re-execution information including the target value set for the step not satisfying a constraint condition.

The final result information storage unit 125 is a storage area to store result information generated by using a value satisfying a constraint condition.

The user terminal apparatus 200 includes an input unit 210, an output unit 220, and a communication unit 230. The input unit 210 receives input operation from a user via an input device. The output unit 220 outputs information to an output device such as a display. For example, the output unit 220 enables the output device to display the CPU setting screen 240 by using output information of the CPU setting screen 240 transmitted from the parallel distributed processing control apparatus 100. For example, the output unit 220 enables the output device to display the final result display screen 250 by using the output information transmitted from the parallel distributed processing control apparatus 100. The communication unit 230 transmits and receives information to and from the parallel distributed processing control apparatus 100.

The server apparatus 300 includes a control unit 310 and a communication unit 320. The control unit 310 integrally controls the entire server apparatus 300. The communication unit 320 transmits and receives information to and from the parallel distributed processing control apparatus 100. The control unit 310 includes a simulation execution unit 311. The simulation execution unit 311 performs the simulation by using a CPU included in the server apparatus 300. As an example, the simulation execution unit 311 obtains the master data from the parallel distributed processing control apparatus 100, and executes the simulation by using the master data.

The parallel distributed processing control system 1 includes the plurality of CPUs in the entire system, and each CPU executes the simulation for each step constituting the divided model allocated by the CPU allocation unit 1121. Hereinafter, the description is made using an example in which the server apparatus 300 includes the plurality of CPUs that execute the simulation, and the engine execution unit 1122 of the parallel distributed processing control apparatus 100 transmits a signal indicating an instruction to start the simulation to the server apparatus 300. In this case, the simulation execution unit 311 enables each CPU included in the server apparatus 300 to execute the simulation.

Apparatus configuration is not limited thereto, for example, the simulation may be executed by the CPU included in the parallel distributed processing control apparatus 100 and the CPU included in the server apparatus 300. In this case, in order to secure the CPU used by the execution control unit 113, it is desired that the engine execution unit enables a number of CPUs (the number being the total number of the CPUs included in the parallel distributed processing control system−1) to execute the simulation.

FIG. 2 is a diagram showing an example of a hardware configuration of the parallel distributed processing control apparatus 100. The parallel distributed processing control apparatus 100 includes constituents including the input device 161, an output device 162, an external storage device 163, an arithmetic device 164, a main storage device 165, and a communication device 166 which are connected by a bus 167.

The input device 161 is a device that receives input operation from a user, for example, a touch panel, a keyboard, a mouse, and a microphone. The output device 162 is a device that performs output processing of data stored in the parallel distributed processing control apparatus 100, for example, a display device such as a liquid crystal display (LCD), or a printer. The input unit 130 may use the input device 161, and the output unit 140 may use the output device 162.

The external storage device 163 is, for example, a writable and readable storage medium such as a hard disk drive (HDD). The arithmetic device 164 is a central arithmetic device such as a CPU, and executes processing in accordance with a program recorded in the main storage device 165 or the external storage device 163. As the arithmetic device 164 executes the program, each processing unit that constitutes the control unit 110 implements various functions. Only one arithmetic device 164 is shown in FIG. 2 for the sake of convenience, but the number of the CPUs is not limited thereto.

The main storage device 165 is a storage device such as a random access memory (RAM), and functions as a storage area where a program and data are temporarily read. The communication device 166 is a device that connects the parallel distributed processing control apparatus 100 to the network 50, for example, a communication device such as a network interface card (NIC).

Function of the storage unit 120 is implemented by the main storage device 165 or the external storage device 163. The function of the storage unit 120 may be implemented by a storage device on the network 50.

Processing of each constituent in the parallel distributed processing control apparatus 100 may be executed by one piece of hardware, or by a plurality of pieces of hardware. The processing of each constituent in the parallel distributed processing control apparatus 100 may be implemented by one program, or by a plurality of programs.

The user terminal apparatus 200 and the server apparatus 300 have the same hardware configuration as that of the parallel distributed processing control apparatus 100. Therefore, the description of the hardware configurations of the user terminal apparatus 200 and the server apparatus 300 is omitted. As described above, the server apparatus 300 according to the present embodiment includes a plurality of CPUs.

FIG. 3 is a diagram showing an example of a data structure of a supply chain configuration master 10. The supply chain configuration master 10 is step information including the plurality of steps constituting the product distribution process of the product, and is read by the initial model reception unit 1111 as the master data. The supply chain configuration master 10 is stored in the master information storage unit 121.

The supply chain configuration master 10 includes a company name 10a, a company class 10b, an item 10c, a supplier company 10d, and a customer company 10e. The company name 10a is information indicating each company constituting the supply chain, for example, a name or identification information of a company serving as a supply source of a product in the production distribution process. The company class 10b is information indicating a type of the company. The item 10c is an item of the product handled by the company. That is, the supply chain configuration master 10 includes the steps including each company that executes the production distribution process and the items of the product.

The supplier company 10d is information indicating a company serving as a supplier of the product. The customer company 10e is information indicating a company serving as a customer of the product.

FIG. 4 is a diagram showing an example of a data structure of an item master 20. The item master 20 includes an item name 20a, a weight 20b, and a volume 20c. The item master 20 is stored in the master information storage unit 121. The item name 20a is information indicating an item of the product. The weight 20b is information indicating a weight of the product specified by the item name 20a. The volume 20c is information indicating a volume of the product specified by the item name 20a.

FIG. 5 is a diagram showing an example of a data structure of a constraint master 30. The constraint master 30 indicates a constraint that must be taken into consideration in the entire supply chain, and is stored in the master information storage unit 121. The constraint master 30 includes a company 30a, a constraint item 30b, a constraint type 30c, a constraint value 30d, and a priority constraint flag 30e. The company 30a is information indicating each company constituting the supply chain. The constraint item 30b is information specifying an item of a constraint condition. The constraint type 30c is information indicating a type of a constraint.

The constraint value 30d is information indicating a value to be a constraint condition. The priority constraint flag 30e is information indicating whether or not a constraint condition specified by a record having the priority constraint flag 30e exerts influence. Details thereof are described below. For example, in a case where the priority constraint flag is "1", it is taken as having the priority constraint flag and the constraint condition exerts influence. In a case where the priority constraint flag is "0", it is taken as having no priority constraint flag and the constraint condition does not exert influence.

The constraint master 30 can be regarded as information in which a constraint value is stored in accordance with a combination of each company that executes the production distribution process and the constraint item.

As an example, for the first record from the top among the constraint master 30 shown in FIG. 5, the company 30a is a "factory A", the constraint item 30b is a "production quantity", the constraint type 30c is an "upper limit", and the constraint value 30d is "100 pieces/day", and the priority constraint flag 30e is "1". This indicates that the "upper limit" for the "production quantity" of the product produced by the "factory A" is "100 pieces per day" and the constraint condition exerts influence when the simulation is performed.

FIG. 6 is a diagram showing an example of a data structure of a bill of materials (BOM) master 40. The BOM master 40 is stored in the master information storage unit 121. The BOM master 40 includes a parent item 40a, a child item 40b, and a consumption quantity 40c. The parent item 40a is information indicating the item of the product. The child item 40b is information indicating other items constituting the product related to the parent item 40a. The consumption quantity 40c is a value indicating the number of the child items 40b required to produce one unit of the product of the parent item 40a. That is, when one unit of an "item A" shown in FIG. 6 is produced, two units of an "item α" and three units of an "item β" are required.

FIG. 7 is a flowchart showing an example of a divided model generation processing according to the present embodiment. This processing is, for example, executed periodically in the parallel distributed processing control apparatus 100.

First, the initial model reception unit 1111 reads the master data (step S100). Specifically, the initial model reception unit 1111 reads the supply chain configuration master 10, the item master 20, the constraint master 30, and the BOM master 40 from the user terminal apparatus 200. The initial model reception unit 1111 may also read the master data from an apparatus other than the user terminal apparatus 200.

Next, the divided model generation unit 1112 generates an item cluster (step S101). The divided model generation unit 1112 groups the items on the basis of the supply chain configuration master 10, the item master 20, and the BOM master 40. More specifically, the divided model generation unit 1112 generates one group for one parent item 40*a* with reference to the BOM master 40. Next, for the parent items 40*a* having the common child item 40*b*, the divided model generation unit 1112 assigns one parent item 40*a* and the child item 40*b* necessary for production of one parent item 40*a* to a group to which the another parent item 40*a* belongs.

FIG. 8 is a diagram showing an example of a data structure of item cluster information 1220. The item cluster information 1220 includes cluster identification information 1220*a* and an item 1220*b*. The cluster identification information 1220*a* is identification information specifying a group of the items. The item 1220*b* is information specifying an item assigned to the group specified by the cluster identification information 1220*a*.

Among the items constituting the BOM master 40 shown in FIG. 6, the "item A", and the "item α" and the "item β" that constitute the "item A" are associated with a group "G1" in the cluster identification information 1220*a* of the item cluster information 1220 in FIG. 8. In the BOM master 40 in FIG. 6, an "item θ" is the child item of an "item B", and also the child item of an "item C". Therefore, in the item cluster information 1220 shown in FIG. 8, the "item B", an "item γ" and the "item θ" that constitute the "item B", and the "item C" are associated with a group "G2" in the cluster identification information 1220*a*.

The description returns to FIG. 7. Next, the divided model generation unit 1112 generates a divided model (step S102). Specifically, the divided model generation unit 1112 groups the steps included in the supply chain configuration master 10 by using the item cluster information 1220, thereby generating divided model information 1221.

FIG. 9 is a diagram showing an example of a data structure of the divided model information 1221. The divided model information 1221 is stored in the divided model information storage unit 122. The divided model information 1221 includes cluster identification information 1221*a*, a company name 1221*b*, a company class 1221*c*, an item 1221*d*, a supplier company 1221*e*, and a customer company 1221*f*.

The cluster identification information 1221*a* is identification information specifying a group to which the step belongs. The company name 1221*b* is information indicating each company constituting the supply chain. The company class 1221*c* is information indicating a type of the company. The item 1221*d* is an item of the product handled by the company. The supplier company 1221*e* is information indicating a company serving as a supplier of the product. The customer company 1221*f* is information indicating a company serving as a customer of the product.

The divided model generation unit 1112 refers to the item 10*c* of the supply chain configuration master 10, and specifies the cluster identification information 1220*a* corresponding to the item in the item cluster information 1220. The divided model generation unit 1112 associates the specified cluster identification information 1220*a* with each record included in the supply chain configuration master 10, thereby generating the divided model information 1221. That is, the divided model generation unit 1112 groups each step included in the supply chain configuration master 10 by using the items, thereby generating the divided model information 1221. Thereafter, the control unit 110 ends processing of the flowchart shown in FIG. 7.

FIG. 10 is a flowchart showing an example of the CPU information generation processing. Processing of the flowchart is started when, for example, the user terminal apparatus 200 receives an input operation of the instruction to start the CPU information generation processing.

First, the output information generation unit 1133 generates the display information of the CPU setting screen 240 (step S200). Thereafter, the display information generated by the output information generation unit 1133 is transmitted to and displayed on the user terminal apparatus 200 that has received the input operation of the instruction to start the CPU information generation processing.

FIG. 19 is a diagram showing an example of the CPU setting screen 240. The CPU setting screen 240 includes a CPU number input area 241 and a setting instruction reception button 242. The CPU number input area 241 is an area for receiving input of the number of the CPUs used for the simulation. The setting instruction reception button 242 is a button for enabling the number of the CPUs input to the CPU number input area 241 to be determined. When a numerical value is input to the CPU number input area 241 and a setting instruction is received by the setting instruction reception button 242, the input number of the CPUs is transmitted to the parallel distributed processing control apparatus 100, and the divided model is allocated to the input number of the CPUs by the CPU allocation unit 1121.

The description returns to FIG. 10. Next, the divided model generation unit 1112 generates CPU information 1222 (step S201). Thereafter, the control unit 110 ends the processing of the flowchart.

The CPU information 1222 only needs to specify the CPU used for execution of the simulation, but the CPU information generation processing is not limited to the example shown in the flowchart. For example, the CPU setting screen 240 may include a server number input area (not shown) instead of the CPU number input area 241. The server number input area is an area for receiving input of the number of the server apparatuses 300 that execute the simulation. In this case, the parallel distributed processing control apparatus 100 has information associated with the number of the server apparatuses 300 and the CPUs in advance so that the CPUs used for the simulation can be specified in accordance with the input number of the server apparatuses 300.

For example, the divided model generation unit 1112 may generate the CPU information 1222 by using information indicating CPUs other than a predetermined CPU to be used by the execution control unit 113 among the CPUs mounted on the parallel distributed processing control apparatus 100 and the server apparatus 300. In this case, even if there is no instruction to start generation of the CPU information 1222, the divided model generation unit 1112 may, for example, periodically generate the CPU information 1222.

FIG. 11 is a diagram showing an example of a data structure of the CPU information 1222. The CPU information 1222 is stored in the divided model information storage unit 122 and includes information specifying a CPU that can be used for execution of the simulation. The divided model generation unit 1112 registers the CPUs of the number input to the CPU number input area 241 in the CPU information 1222.

FIG. 12 is a flowchart showing an example of planning processing. Processing of the flowchart uses the divided model information 1221 generated by the divided model generation processing shown in FIG. 7 and the CPU information 1222 generated by the CPU information generation processing shown in FIG. 10. Therefore, the processing is executed after the divided model generation processing and the CPU information generation processing.

First, the CPU allocation unit 1121 allocates each divided model to the CPU (step S301). As described above, the CPU allocation unit 1121 assigns the divided model so that the processing load of each CPU is equalized. As an example, the CPU allocation unit 1121 refers to the item cluster information 1220 (FIG. 8), and sorts the cluster identification information 1220a in descending order of the number of items 1220b associated with the cluster identification information 1220a. The CPU allocation unit 1121 assigns the cluster identification information 1220a to the CPU included in the CPU information 1222 in the descending order of the number of items. At this time, the CPU allocation unit 1121 refers to the number of items in the divided model allocated to the CPU, and assigns the cluster identification information 1220a having a large number of items to the CPU having a small number of items in the divided model.

An allocation method performed by the CPU allocation unit 1121 is not limited thereto. For example, the CPU may be allocated in order from a divided model having a small number of items.

FIG. 13 is a diagram showing an example of a data structure of CPU allocation information 1230. The CPU allocation information 1230 is stored in the daily result information storage unit 123. The CPU allocation information 1230 includes a CPU 1230a and cluster identification information 1230b. The CPU 1230a is identification information specifying the CPU. The cluster identification information 1230b is identification information specifying a group for the divided model allocated to the CPU of the CPU 1230a.

The description returns to FIG. 12. Next, the calculation execution unit 112 and the execution control unit 113 repeat the processing from step S302 to step S307 from a first day to an end day of a calculation period. Prior to the processing, the parallel distributed processing control apparatus 100 receives designation of the calculation period. Hereinafter, an embodiment in which the simulation result is calculated every day within the calculation period is described, but a calculation span of the simulation result is not limited thereto, and may be arbitrary.

First, the engine execution unit 1122 executes calculation for one day, and aggregates an execution result of each CPU (step S303). Specifically, the engine execution unit 1122 enables each CPU to execute calculation processing for one day within the calculation period designated before the start of the processing. The engine execution unit 1122 extracts the cluster identification information 1230b allocated to each CPU with reference to the CPU allocation information 1230. The engine execution unit 1122 refers to the divided model information 1221, enables each CPU to calculate a value as a calculation result for a record (step) specified by the extracted cluster identification information 1221a, and generates daily result information 1231.

FIG. 14 is a diagram showing an example of a data structure of the daily result information 1231. The daily result information 1231 is stored in the daily result information storage unit 123, and includes calculation time 1231a, a CPU 1231b, a company 1231c, an item 1231d, a constraint item 1231e, a result day 1231f, and a result 1231g.

The calculation time 1231a is information indicating a day when calculation is executed. The CPU 1231b is identification information specifying the CPU that performs the calculation. The company 1231c is information indicating each company constituting the supply chain. The item 1231d is information indicating an item of a product handled by the company 1231c.

The constraint item 1231e is information specifying an item of a constraint condition. The result day 1231f is information indicating a day when the calculation is performed. The result 1231g is a value calculated by the CPU on the result day 1231f for the step related to the company 1231c and the item 1231d under control of the engine execution unit 1122.

For example, in an uppermost record of the daily result information 1231 shown in FIG. 14, the calculation time 1231a is "2018/3/1", the CPU 1231b is "001", the company 1231c is "factory A", the item 1231d is "item A", the constraint item 1231e is "production quantity", the result day 1231f is "2018/3/1", and the result 1231g is "130". This indicates that at the calculation time "2018/3/1", the CPU specified by identification information of "001" has the "production quantity" for the "item A" produced on the "2018/3/1" at the "factory A" as "130" units.

The value calculated under the control of the engine execution unit 1122 is an actual value or a planned value for the step. In a case where planned time and a result day are the same, the calculated value is the actual value assumed to actually occur in the production distribution process. In a case where the result day is earlier than the planned time, the calculated value is the planned value for the result day at the planned time. In the uppermost record in FIG. 14, since both the calculation time 1231a and the result day 1231f are "2018/3/1", a value related to the result 1231g is regarded as the actual value.

The result day 1231f of the daily result information 1231 shown in FIG. 14 includes days from "2018/3/1" to "2018/3/3". That is, the daily result information 1231 in the figure is information generated by repeating processing of steps S302 to S307 shown in FIG. 12 by the number of days.

The description returns to step S303 in FIG. 12. After generating the daily result information 1231, the engine execution unit 1122 aggregates the execution result of each CPU. More specifically, the engine execution unit 1122 adds a value for each combination of the company and the constraint item together. Description is made with reference to FIG. 14. The engine execution unit 1122 extracts common records for a combination of the company 1231c, the constraint item 1231e, and the result day 1231f. The engine execution unit 1122 adds the results 1231g of the extracted records together.

In FIG. 14, records in which the company 1231c is a "factory A", the constraint item 1231e is a "production quantity" and the result day 1231f is "2018/3/1" are an uppermost record (a record in which the item 1231d is an "item A") and a third record from the bottom (a record in which the item 1231d is an "item B"). The results 1231g included in these records are added together to obtain a value "250".

FIG. 15 is a diagram showing an example of a data structure of constraint violation information 1232. The constraint violation information 1232 is stored in the daily result information storage unit 123, and includes a company 1232a, a constraint item 1232b, a result day 1232c, and a total quantity 1232d. Since the company 1232a corresponds to the company 1231c in FIG. 14, the constraint item 1232b corresponds to the constraint item 1231e in FIG. 14, and the result day 1232c corresponds to the result day 1231f, the description thereof is omitted.

The total quantity 1232*d* is a value obtained by adding the results 1231*g* of records in which the combination of the company 1231*c*, the constraint item 1231*e*, and the result day 1231*f* among the records constituting the daily result information 1231 is common.

In the constraint violation information 1232 of FIG. 15, for a record in which the company 1232*a* is a "factory A", the constraint item 1232*b* is a "production quantity" and the result day 1232*c* is "2018/3/1", the value "250" obtained by adding the results 1231*g* in FIG. 14 together is included as the total quantity 1232*d*. This record indicates a step having the same calculation time and the result day, that is, a total quantity of the actual value.

The description returns to FIG. 12. Next, the constraint monitoring unit 1131 determines whether there is a constraint violation (step S304). Specifically, the constraint monitoring unit 1131 compares a total quantity calculated in step S303 with a constraint value included in the constraint master 30, thereby determining whether a condition specified by a constraint value is satisfied.

This is described in more detail. The constraint monitoring unit 1131 extracts one record of the constraint violation information 1232 (FIG. 15), and determines whether the total quantity 1232*d* of the record is the total quantity of the actual value or a total quantity of the planned value.

Next, the constraint monitoring unit 1131 refers to the constraint master 30 (FIG. 5), and specifies a combination of the company 1232*a* and the constraint item 1232*b* included in the extracted record of the constraint violation information 1232. The constraint monitoring unit 1131 specifies a record in the constraint master 30 having the company 30*a* and the constraint item 30*b* same as the company 1232*a* and the constraint item 1232*b*. Next, in a case where the extracted record of the constraint violation information 1232 is a record of the actual value, the priority constraint flag 30*e* included in the specified record of the constraint master 30 is referred to. In a case where the priority constraint flag 30*e* is information which indicates that a constraint condition does not exert influence ("0" in FIG. 5), the constraint monitoring unit 1131 determines that the total quantity 1232*d* satisfies a condition related to a constraint value, and the processing is advanced.

In a case where the priority constraint flag 30*e* is information which indicates that a constraint condition exerts influence ("1" in FIG. 5), it is determined whether the total quantity 1232*d* of the constraint violation information 1232 satisfies a condition of the constraint type 30*c* and the constraint value 30*d* in the constraint master 30.

In an uppermost record of the constraint violation information 1232 in FIG. 15, the company 1232*a* is a "factory A" and the constraint item 1232*b* is a "production quantity". As described above, since the total quantity 1232*d* of the record is the actual value, content of the priority constraint flag is referred to in determination of whether a constraint condition is sufficient. In the uppermost record of the constraint master 30 shown in FIG. 5, the company 30*a* is the "factory A", the constraint item 30*b* is the "production quantity", which corresponds to the uppermost record of the constraint violation information 1232.

The priority constraint flag 30*e* of the uppermost record in FIG. 5 is "1", which indicates that a constraint condition exerts influence. Therefore, the constraint monitoring unit 1131 determines whether the "250" in the total quantity 1232*d* satisfies a condition in the constraint master 30. In the uppermost record in FIG. 5, the constraint type 30*c* is "upper limit" and the constraint value 30*d* is "100 pieces/day". Since the "250" in the total quantity exceeds the upper limit of the constraint value, it is determined that the record of the constraint violation information 1232 does not satisfy the condition.

In a second record of the constraint violation information 1232 in FIG. 15, the company 1232*a* is a "warehouse A", the constraint item 1232*b* is a "delivery quantity", the result day 1232*c* is "2018/3/1", and the total quantity 1232*d* is "400". Since the result day and the calculation time are the same, the total quantity is regarded as the actual value.

A combination of the company 1232*a* and the constraint item 1232*b* in the second record of the constraint violation information 1232 of FIG. 15 are the same with a combination of the company 30*a* and the constraint item 30*b* in the second record of the constraint master 30 of FIG. 5. However, since the total quantity 1232*d* of the constraint violation information 1232 is the actual value and the priority constraint flag 30*e* of the second record of the constraint master 30 is "0", the step related to the constraint violation information 1232 is not influenced by a constraint condition. Therefore, the constraint monitoring unit 1131 determines that the second record of the constraint violation information 1232 satisfies a constraint condition.

In a case where the total quantity 1232*d* of the constraint violation information 1232 is the planned value, it is determined whether the total quantity 1232*d* satisfies a condition set by the constraint master 30 regardless of the priority constraint flag 30*e*. In the simulation of the production distribution process, the actual value is regarded as a value actually supplied to the production distribution process, and the simulation is performed in a direction where the planned value is adjusted basically. Therefore, in principle, the actual value is regarded as a value not influenced by a constraint condition. On the other hand, in a case where an actual value of a certain constraint item cannot be adjusted, a deadlock may occur between such constraint item and another constraint item. Therefore, the priority constraint flag is set and a record can be set as being influenced by a constraint condition even in a case of an actual value, so that the planning corresponding to a wider variety of needs can be executed.

When a total quantity is compared with a constraint value, in a case where units are different, comparison is performed by converting the two units into one unit. For example, the total quantity 1232*d* shown in FIG. 15 is the number of products in the present example, but the constraint value 30*d* shown in FIG. 5 takes a volume as a constraint value. In this case, the volume corresponding to the total quantity 1232*d* is calculated by referring to the item master 20 (FIG. 4), thereby performing a comparison between the total quantity 1232*d* and the constraint value 30*d*.

The description returns to FIG. 12. In step S304, the constraint monitoring unit 1131 determines whether there is constraint violation for all records of the constraint violation information 1232 generated in step S303. In a case where there is no constraint violation in all the records of the constraint violation information 1232, the constraint monitoring unit 1131 determines that there is no constraint violation ("No" in step S304). In this case, the control unit 110 returns the processing to step S303, and executes calculation for another day in a plan period determined in advance.

In a case where the constraint monitoring unit 1131 determines that at least one record has the constraint violation in the records of the constraint violation information 1232 ("Yes" in step S304), the re-execution information generation unit 1132 adjusts a calculation result (step S305). In the processing, in order to comply with a constraint value in the constraint master 30, the execution control unit 113 calculates how much should be adjusted for a total quantity related to the constraint violation information 1232.

As an example, the re-execution information generation unit 1132 specifies a record of the constraint violation information 1232 determined as having the constraint violation in step S304, and specifies the total quantity 1232*d* of the record. The re-execution information generation unit 1132 extracts a record of the daily result information 1231 used for generation of the specified record, and calculates a ratio of the result 1231*g* in the extracted record to a total quantity.

Regarding the above example, it is determined that the uppermost record of the constraint violation information 1232 shown in FIG. 15 violates a constraint. The total quantity 1232*d* of the uppermost record is "250". Records of the daily result information 1231 used for generation of the uppermost record are the uppermost record and the third record from the bottom. Since the result 1231*g* of the uppermost record is "130", a ratio of the "130" to the "250" is calculated as "52%". Similarly, for the third record from the bottom, a ratio of the "120" in the result 1231*g* to the "250" is calculated as "48%". The re-execution information generation unit 1132 generates result adjustment information 1233 including the calculated numerical values.

FIG. 16 is a diagram showing an example of a data structure of the result adjustment information 1233. The result adjustment information 1233 is stored in the daily result information storage unit 123, and includes a company 1233*a*, a constraint item 1233*b*, an item 1233*c*, a result day 1233*d*, and an adjustment rate 1233*e*. The company 1233*a* corresponds to the company 1231*c* of the daily result information 1231, the constraint item 1233*b* corresponds to the constraint item 1231*e* of the daily result information 1231, the item 1233*c* corresponds to the item 1231*d* of the daily result information 1231, and the result day 1233*d* corresponds to the result day 1231*f* of the daily result information 1231.

The adjustment rate 1233*e* is a value indicating a ratio of the result 1231*g* of the daily result information 1231 to the total quantity 1232*d* of the constraint violation information 1232 determined as having the constraint violation. That is, the re-execution information generation unit 1132 associates the adjustment rate 1233*e* with the daily result information 1231 constituting the constraint violation information 1232 determined as having the constraint violation, thereby generating the result adjustment information 1233.

The result adjustment information 1233 may include a numerical value serving as a condition for imposing a calculation restriction on each CPU, so that a value satisfying a constraint value is calculated for the step having the constraint violation, and the numerical value is not limited to the adjustment rate. For example, a ratio of the result 1231*g* of the daily result information 1231 to a difference between a constraint value and a total quantity may be used.

The description returns to FIG. 12. Next, the re-execution information generation unit 1132 generates re-execution information 1240 (step S306).

FIG. 17 is a diagram showing an example of a data structure of the re-execution information 1240. The re-execution information 1240 is stored in the re-execution information storage unit 124, and includes a CPU 1240*a*, a re-execution day 1240*b*, a company 1240*c*, an item 1240*d*, a constraint item 1240*e*, a result day 1240*f*, and a target value 1240*g*.

The CPU 1240*a* is identification information that specifies the CPU that calculates a value of the step constituting the re-execution information 1240. The re-execution day 1240*b* is a day when the CPU calculates the value of the step. The company 1240*c* is information that indicates each company constituting the supply chain. The item 1240*d* is information that indicates the item of the product. The constraint item 1240*e* is information that specifies an item of the constraint condition. The result day 1240*f* is information that indicates a day when calculation is performed. The target value 1240*g* is a target value for the value of the step calculated by the CPU related to the CPU 1240*a*.

The re-execution information generation unit 1132 associates the company 1233*a*, the constraint item 1233*b*, the item 1233*c*, and the result day 1233*d* in the result adjustment information 1233, and generates a record of the re-execution information 1240. The re-execution information generation unit 1132 refers to the item cluster information 1220 by using the item 1240*d* of the generated record, and specifies the corresponding cluster identification information 1220*a*. The re-execution information generation unit 1132 refers to the CPU allocation information 1230, specifies the CPU 1230*a* corresponding to the specified cluster identification information 1230*b*, and sets the specified CPU 1230*a* as the CPU 1240*a* of the re-execution information 1240. The re-execution day 1240*b* of the re-execution information 1240 is arbitrary, as an example, a day when the re-execution information 1240 is generated is regarded as the re-execution day.

The re-execution information generation unit 1132 calculates the target value. As an example, a value obtained by multiplying a constraint value by an adjustment rate is set as the target value. More specifically, the re-execution information generation unit 1132 specifies a record in the constraint master 30 having the same company and constraint item as the company 1233*a* and the constraint item 1233*b* in a record of the result adjustment information 1233. The re-execution information generation unit 1132 calculates the target value by multiplying the constraint value 30*d* of the specified record by the adjustment rate 1233*e* of the result adjustment information 1233. If necessary, a unit is normalized.

The target value is a value of each step that satisfies a constraint value. Therefore, a method of calculating the target value is not limited to the above example.

The description returns to FIG. 12. Next, the engine execution unit 1122 performs recalculation by using the re-execution information 1240 (step S307). Specifically, similarly to step S303, the engine execution unit 1122 enables each CPU to calculate a value serving as a calculation result for the step constituting the re-execution information 1240. At this time, the engine execution unit 1122 instructs each CPU to calculate to satisfy a condition specified by the target value. Logic for each CPU to comply with the target value is not particularly limited. For example, a heuristic method such as piling without leveling may be used, or an optimization method such as a mathematical programming method may be applied.

In step S306, when the re-execution information 1240 is generated, in a case where the re-execution day 1240*b* is not set as a day when the re-execution information 1240 is generated, this process can be omitted.

Thereafter, the engine execution unit 1122 updates the result 1231*g* of the daily result information 1231 by using the value obtained as a result of the recalculation.

When processing of steps S302 to S307 is performed for all schedules of the predetermined plan period, the output information generation unit 1133 generates final result information 1250 (step S308). Thereafter, the control unit 110 ends the processing of the flowchart.

FIG. 18 is a diagram showing an example of a data structure of the final result information 1250. The final result information 1250 is stored in the final result information storage unit 125, and includes a company 1250a, an item 1250b, a calculation time 1250c, a result item 1250d, a planned day 1250e, and a quantity 1250f. The company 1250a is a name or identification information of a company serving as a supply source of a product. The item 1250b is identification information that specifies an item of the product.

The calculation time 1250c is information indicating a day when the engine execution unit 1122 enables each CPU to execute calculation. The result item 1250d is information indicating an item of a calculation result, and corresponds to the aforementioned constraint item. The planned day 1250e is information indicating a day when the calculation is performed.

The quantity 1250f is a value calculated on a day related to the calculation time 1250c, and indicates a predicted supply quantity of the product, in which a company related to the company 1250a supplies a product indicated in the item 1250b on a day related to the planned day 1250e to the production distribution process by using a supply method indicated in constraint item 1240e.

In the present embodiment, the output information generation unit 1133 generates the final result information 1250 by using the daily result information 1231. Specifically, the re-execution information generation unit 1132 associates the company 1231c of the daily result information 1231 with the company 1250a, the item 1231d with the item 1250b, the calculation time 1231a with the calculation time 1250c, the constraint item 1231e with the result item 1250d, the result day 1231f with the planned day 1250e, the result 1231g with the quantity 1250f, thereby generating the final result information 1250.

Then, the final result information 1250 may be transmitted to the user terminal apparatus 200, displayed on a display, or may be displayed on a display included in the parallel distributed processing control apparatus 100. The output information generation unit 1133 generates the output information of the final result display screen 250 by using the final result information 1250. The final result display screen 250 may be displayed on the user terminal apparatus 200 or may be displayed on the parallel distributed processing control apparatus 100.

FIG. 20 is a diagram showing an example of the final result display screen 250. The final result display screen 250 includes a company selection area 251, an item selection area 252, a result item selection area 253, and a result display area 254. The company selection area 251 optionally displays a company related to the company 1250a of the final result information 1250. The item selection area 252 optionally displays a product related to the item 1250b of the final result information 1250. The result item selection area 253 optionally displays the result item 1250d of the final result information 1250.

The result display area 254 displays the quantity 1250f included in the final result information 1250. In the final result information 1250, the quantity 1250f is associated with the different planned day 1250e for a plurality of records in which the company 1250a, the item 1250b, and the result item 1250d are common. The output information generating unit 1133 generates output information of the result display area 254 that displays a quantity in accordance with a change of the planned day.

In the result item selection area 253 of FIG. 20, tabs described as "inventory change", "production plan", "supply plan", "procurement plan", and "sales plan" are optionally displayed. The "inventory change" indicates a change in the quantity 1250f in which the result item 1250d is an "inventory quantity". The "production plan" indicates a change in the quantity 1250f in which the result item 1250d is a "production quantity". The "supply plan" indicates a change in the quantity 1250f in which the result item 1250d is a "supply quantity". The "procurement plan" indicates a change in the quantity 1250f in which the result item 1250d is a "procurement quantity". The "sales plan" indicates a change in the quantity 1250f in which the result item 1250d is a "sales quantity". A display form of the result item selection area 253 is not limited to the example shown in FIG. 20.

As described above, in the present embodiment, since the calculation model in the production distribution process is calculated by appropriately dividing and then allocating the calculation model to each CPU so as to equalize the processing load, high-speed calculation can be implemented by parallel processing. Further, since constraints that exist between the models can be considered, even if calculation is performed with the calculation model being divided, for example, efficient planning of the production distribution plan is not hindered.

In a case where the calculation model is divided, a dependency relationship may occur in each calculation model. In the present embodiment, the dependency relationship of the calculation model can be reduced, and calculation speed can be improved by dividing the calculation model in accordance with the item. Improvement in the calculation speed can be implemented by parallel distributed processing, and a result in consideration of constraints of the entire calculation model can be calculated. Therefore, according to the present embodiment, it is possible to support more efficient production distribution planning.

The embodiments and modifications of the invention have been described above, but the invention is not limited to an example of the above embodiments, and includes various modifications. For example, the example of the above-described embodiments has been described in detail in order to make the invention easy to understand, and the invention is not limited to including all the configurations described herein. A part of a configuration of an example in a certain embodiment can be replaced with a configuration of another example. A configuration of another example can be added to a configuration of an example of a certain embodiment. Another configuration may be added to, deleted from, or replaced with a part of a configuration of an example in each embodiment. Each of the configurations, functions, processing units, processing methods described above may be partially or entirely implemented by hardware such as through design using an integrated circuit. Control lines and information lines shown in the figures are the ones considered to be necessary for description, and all the lines are not necessarily shown. It may be considered that almost all configurations are connected to each other.

The functional configurations of the parallel distributed processing control apparatus 100, the user terminal apparatus 200, and the server apparatus 300 are classified according to main processing content in order to facilitate understanding. The invention is not limited by a classification method and names of the constituents. As described above, the parallel distributed processing control apparatus 100, the user terminal apparatus 200, and the server apparatus 300 can be classified into more constituents according to the processing content. One constituent can also be classified to execute more processing.

REFERENCE SIGN LIST 1 parallel distributed processing control system
10 supply chain configuration master
20 item master
30 constraint master
40 BOM master
50 network
100 parallel distributed processing control apparatus
110, 310 control unit
111 model division unit
112 calculation execution unit
113 execution control unit
120 storage unit
121 master information storage unit
122 divided model information storage unit
123 daily result information storage unit
124 re-execution information storage unit
125 final result information storage unit
130, 210 input unit
140, 220 output unit
150, 230, 320 communication unit
161 input device
162 output device
163 external storage device
164 arithmetic device
165 main storage device
166 communication device
200 user terminal apparatus
240 CPU setting screen
241 CPU number input area
242 setting instruction reception button
250 final result display screen
251 company selection area
252 item selection area
253 result item selection area
254 result display area
300 server apparatus
311 simulation execution unit
1111 initial model reception unit
1112 divided model generation unit
1121 CPU allocation unit
1122 engine execution unit
1131 constraint monitoring unit
1132 re-execution information generation unit
1133 output information generation unit
1220 item cluster information
1221 divided model information
1222 CPU information
1230 CPU allocation information
1231 daily result information
1232 constraint violation information
1233 result adjustment information
1240 re-execution information
1250 final result information

The invention claimed is:

1. A parallel distributed processing control system comprising:
a storage device that stores step information including a plurality of steps and a plurality of items respectively associated with each step constituting a production distribution process of a product, central processing unit (CPU) information on a plurality of first CPUs that calculate a value of a simulation result for the step, and a constraint value in the production distribution process;
one or more second CPUs programmed to:
generate item cluster information indicating a plurality of groups and, for each group, two or more related items belonging to the group,
associate each group in the item cluster information with each step in the step information to generate a divided model;
allocate the divided model to the plurality of first CPUs so that processing loads of the plurality of first CPUs are equalized;
instruct each first CPU to calculate the value for the step constituting the divided model;
determine whether the value satisfies a condition specified by the constraint value; and
generate result information by using the value satisfying the condition.

2. The parallel distributed processing control system according to claim 1, wherein the one or more second CPUs are programmed to:
set a target value by using the constraint value for the step related to the value that does not satisfy the condition, and generates re-execution information in which the step and the target value are associated with each other,
specify a first CPU of the plurality of first CPUs for the re-execution information, and
instruct the specified first CPU to calculate the value by using the re-execution information.

3. The parallel distributed processing control system according to claim 1, wherein
the storage device stores the constraint value for a combination of each company executing the production distribution process and a constraint item, and
wherein the one or more second CPUs are programmed to add the value for each combination of the company and the constraint item, and compare the added value with the constraint value, thereby determining whether the value satisfies the condition for the step.

4. The parallel distributed processing control system according to claim 3,
wherein the one or more second CPUs are programmed to:
calculate an actual value or a planned value as the value for the step,
upon determining the priority constraint flag is information indicating that the condition does not exert influence, determine that the actual value of the step satisfies the condition, and
wherein the storage unit stores the step related to the constraint value in association with presence or absence of a priority constraint flag.

5. The parallel distributed processing control system according to claim 3,
wherein the constraint item includes at least one of a production quantity, a delivery quantity, a storage quantity, a storage fee, and a transport quantity.

6. The parallel distributed processing control system according to claim 1,
wherein the step information includes the step including each company executing the production distribution process and an item of the product,
wherein the one or more second CPUs are programmed to generate the divided model by grouping the steps based on the item, and allocate the divided model so that a number of items included in the divided model is equalized.

7. The parallel distributed processing control system according to claim 1,
wherein the one or more second CPUs are programmed to:
output information of a CPU setting screen that receives input indicating a number of first CPUs used for simulation execution, and
allocate the divided model to the CPUs of the number input to the CPU setting screen.

8. A non-transitory computer readable medium storing a program that enables a computer to function as a parallel distributed processing control apparatus, the program storing executable instructions, comprising:
store step information including a plurality of steps constituting a production distribution process of a product, central processing unit (CPU) information on a plurality of CPUs that calculate a value of a simulation result for the step, and a constraint value in the production distribution process,
generate item cluster information indicating a plurality of groups and, for each group, two or more related items belonging to the group,
generating a divided model by associating each group in the item cluster information with each step in the step information,
allocate the divided model to the plurality of CPUs so that processing loads of the plurality of CPUs are equalized,
an engine execution procedure of enabling the CPU to calculate the value for the step constituting the divided model,
a constraint monitoring procedure of determining whether the value satisfies a condition specified by the constraint value,
an output information generation procedure of generating result information by using the value satisfying the condition.

9. A parallel distributed processing control method executed by a parallel distributed processing control apparatus, the parallel distributed processing control apparatus including a storage device and one or more processors, the method executed by the one or more processors, comprising:
storing, by the storage device, step information including a plurality of steps constituting a production distribution process of a product, central processing unit (CPU) information on a plurality of CPUs that calculate a value of a simulation result for the step, and a constraint value in the production distribution process;
generating item cluster information indicating a plurality of groups and, for each group, two or more related items belonging to the group;
executing a divided model generation procedure of generating a divided model by associating each group in the item cluster information with each step in the step information;
a CPU allocation procedure of allocating the divided model to the plurality of CPUs so that processing loads of the plurality of CPUs are equalized;
executing an engine execution procedure of enabling the CPU to calculate the value for the step constituting the divided model;
executing a constraint monitoring procedure of determining whether the value satisfies a condition specified by the constraint value; and
executing an output information generation procedure of generating result information by using the value satisfying the condition.

* * * * *